Patented Jan. 19, 1926.

1,570,046

UNITED STATES PATENT OFFICE.

MOSES L. CROSSLEY, OF SOMERVILLE, AND GEORGE S. SIMPSON, OF PLAINFIELD, NEW JERSEY.

PROCESS OF SULPHONATING BETA NAPHTHOL.

No Drawing.   Application filed October 14, 1922.   Serial No. 594,607.

*To all whom it may concern:*

Be it known that we, MOSES L. CROSSLEY and GEORGE S. SIMPSON, citizens of the United States, residing at Somerville and Plainfield, respectively, counties of Somerset and Union, respectively, and State of New Jersey, have invented certain new and useful Improvements in Processes of Sulphonating Beta Naphthol, fully described and represented in the following specification.

This invention relates to improvements in the process of sulphonating beta-naphthol The object of the invention is to increase the yield, without increasing the cost of production. Of course, an increase of the yield of sulphonated beta-naphthol means there is less by-product, and it is a great advantage of the new process that there is less $SO_2$ formed.

The invention comprises the use of a special catalyst during the sulphonation process. We have found that certain compounds of boron, particularly those containing oxygen, such as boric acid or salts of boric acid, act as very efficient catalysts when present during the reaction between beta-naphthol and sulphuric acid. Such a catalyst improves the yield and the quality of the mixed sulphonic acids obtained from the reaction. Only small amounts of the catalyst are required.

The amount of the catalyst may vary within considerable limits. It is an important advantage of the invention that only a very small amount is necessary, as will appear from the examples hereinafter set forth.

The catalytic material may be either boric acid or a salt of boric acid, as, for example, sodium borate. The ordinary technical or commercial grades of these materials will be satisfactory.

In order to explain the invention further, we give two examples illustrative of the invention, the proportions being given by weight.

Example 1.

To 1000 parts of 100% sulphuric acid is added one part of boric acid or the equivalent amount of some salt of boric acid. To this mixture is then added 200 parts of beta-naphthol while thoroughly stirring the mixture. The stirring is continued throughout the sulphonation.

After the addition of all the beta-naphthol to the acid, the mixture is heated to raise the temperature gradually, for example, to 100° C. in about two hours. Then it is held at about this temperature for about two hours, whereupon the sulphonation will be complete. The resulting mixture will consist principally of a mixture of sulphonic acids with some sulphuric acid. The mixed sulphonic acids are freed of the excess sulphuric acid in the usual way. Then the mixture of sulphonic acids may be treated in any suitable way to separate them.

Example 2.

To 800 parts of sulphuric acid of a strength determined by the kinds and relative amounts of beta-naphthol sulphonic acids to be produced there is added a small amount of boric acid or a salt thereof. In usual practice the amount of boric acid added either as acid or as a component of the salt may vary, but about 1 part is sufficient for the quantity of sulphuric acid stated above. Then 200 parts of beta-naphthol are added to the sulphuric acid, this addition being made at a relatively rapid rate, as, for example, in about two minutes. The mixture is thoroughly stirred during the addition of the beta naphthol and the stirring continued throughout the sulphonation.

The mixture is gradually heated by a suitable source of heat so as to reach a temperature of about 100° C. in about two hours. It is then held at that temperature for about three hours and then about 200 parts of 104% sulphuric acid are added within a definite period of time, usually about one hour. The temperature is regulated during the addition of the oleum so as not to exceed the maximum required for the sulphonation. In practice the temperature is maintained between 96° and 101° C. After all the oleum has been added the stirring is continued and the temperature regulated as stated until the sulphonation is completed, which is determined by tests of samples taken from time to time, and may vary according to the products and the proportions thereof which it is desired to obtain.

For example, if the sulphonated products are to contain no mono-sulphonic acids, the sulphonation is continued until a test sample fails to give the characteristic Schaeffer acid test.

Upon the completion of the desired sulphonation, the mixture is freed from sulphuric acid in the usual way. Then the mixed sulphonic acids may be treated to separate them in any desired way.

What is claimed is:

1. The process of sulphonating beta-naphthol, which comprises reacting upon it with sulphuric acid in the presence of a boron compound containing oxygen.

2. The process of sulphonating beta-naphthol, which comprises reacting upon it with sulphuric acid in the presence of a catalyst comprising an oxygen-containing derivative of boron.

3. The process of sulphonating beta-naphthol, which comprises reacting upon it with sulphuric acid in the presence of a catalyst containing boric acid.

4. The process of sulphonating beta-naphthol, which comprises preparing a mixture of sulphuric acid and a catalyst comprising boric acid, then adding the beta-naphthol while continuously stirring the mixture.

5. A process of sulphonating beta-naphthol which comprises preparing a mixture of sulphuric acid and a boron compound containing oxygen, then adding beta-naphthol while stirring the mixture, then gradually raising the temperature of the mixture to about 100° C., and maintaining it at this temperature for several hours until the sulphonation is complete.

In testimony whereof, we have hereunto set our hands.

MOSES L. CROSSLEY.
GEORGE S. SIMPSON.